(12) United States Patent
Sturgill (10) Patent No.: US 12,179,238 B2
(45) Date of Patent: Dec. 31, 2024

(54) DEBRIS CLEARING SYSTEM AND METHOD

(71) Applicant: Watershed Systems, LLC, Dayton, OH (US)

(72) Inventor: Allen H. Sturgill, Tipp City, OH (US)

(73) Assignee: Watershed Systems, LLC, Dayton, OH (US)

(*) Notice: Subject to any disclaimer, the term of this patent is extended or adjusted under 35 U.S.C. 154(b) by 0 days.

(21) Appl. No.: 18/452,650

(22) Filed: Aug. 21, 2023

(65) Prior Publication Data

US 2024/0058844 A1 Feb. 22, 2024

Related U.S. Application Data (60) Provisional application No. 63/373,117, filed on Aug. 22, 2022.

(51) Int. Cl.
*B08B 1/32* (2024.01)
*A46B 13/02* (2006.01)
(Continued)

(52) U.S. Cl.
CPC ............ *B08B 1/32* (2024.01); *A46B 13/02* (2013.01); *A46B 15/0004* (2013.01);
(Continued)

(58) Field of Classification Search
None
See application file for complete search history.

(56) References Cited

U.S. PATENT DOCUMENTS

| 148,557 | A | * | 3/1847 | Gillespie et al. | ...... B01D 29/33 |
| | | | | | 417/151 |
| 5,404 | A | * | 12/1847 | Watson | ................ B01D 29/118 |
| | | | | | 210/415 |

(Continued)

FOREIGN PATENT DOCUMENTS

| CN | 106759802 A | * | 5/2017 |
| CN | 210947456 U | * | 7/2020 |

(Continued)

OTHER PUBLICATIONS

European Patent Office; Search Report and Written Opinion in related International Patent Application No. PCT/US2023/030692 dated Nov. 14, 2023.

*Primary Examiner* — Robert J Popovics
(74) *Attorney, Agent, or Firm* — Wood Herron & Evans LLP (57) ABSTRACT

A debris clearing system for clearing debris from a drain strainer includes a base member having at least one attachment coupler configured to removably attach the base member to the drain strainer, a support frame rotatably coupled to the base member, at least one arm assembly coupled to the support frame, a clearing member coupled to a distal end of the at least one arm assembly. The clearing member being adjacent the exterior surface of the drain strainer when the base member is coupled to the drain strainer. The system includes a drive unit coupled to the support frame to rotate the support frame and the at least one arm assembly relative to the base member. The clearing member clears debris from the exterior surface of the drain strainer when the drive unit rotates the support frame and the at least one arm assembly.

5 Claims, 11 Drawing Sheets

(51) Int. Cl.
*A46B 15/00* (2006.01)
*B01D 29/33* (2006.01)
*B01D 35/02* (2006.01)
*B01D 41/04* (2006.01)
*B08B 1/12* (2024.01)
*B08B 13/00* (2006.01)
*E04D 13/04* (2006.01)

(52) U.S. Cl.
CPC .......... *A46B 15/0055* (2013.01); *B01D 29/33* (2013.01); *B01D 35/02* (2013.01); *B01D 41/04* (2013.01); *B08B 1/12* (2024.01); *B08B 13/00* (2013.01); *A46B 2200/3073* (2013.01); *B01D 2201/08* (2013.01); *E04D 13/0404* (2013.01)

(56) References Cited

U.S. PATENT DOCUMENTS

| | | | | | |
|---|---|---|---|---|---|
| 337,423 | A * | 3/1886 | Moore | B01D 24/10 210/411 |
| 578,179 | A * | 3/1897 | Wolford | B01D 29/118 210/414 |
| 580,209 | A * | 4/1897 | Davidson et al. | B01D 29/118 210/414 |
| 616,033 | A * | 12/1898 | Sturcke | B01D 33/06 210/415 |
| 664,833 | A * | 1/1901 | Collins | B01D 29/33 166/170 |
| 672,003 | A * | 4/1901 | Lynn | B01D 29/118 210/414 |
| 795,047 | A * | 7/1905 | Lynn | B01D 29/118 210/414 |
| 810,020 | A * | 1/1906 | Applegate | B01D 33/44 210/396 |
| 950,118 | A * | 2/1910 | Rood | B01D 29/118 210/415 |
| 969,364 | A * | 9/1910 | Grootenhuis | B01D 33/06 210/354 |
| 1,033,745 | A * | 7/1912 | Smith | B01D 29/114 210/396 |
| 1,130,725 | A * | 3/1915 | Getts | B01D 33/067 55/296 |
| 1,210,759 | A * | 1/1917 | Breddin | E02B 1/006 210/156 |
| 1,318,363 | A * | 10/1919 | Desrumaux | B01D 24/4673 210/280 |
| 1,639,590 | A * | 8/1927 | Corkran | B01D 29/6415 210/414 |
| 1,741,444 | A * | 12/1929 | Slider | B01D 29/6415 210/355 |
| 2,013,971 | A * | 9/1935 | Raisch | B01D 33/06 210/155 |
| 2,136,853 | A * | 11/1938 | Knecht | B01D 29/44 210/414 |
| 2,243,559 | A * | 5/1941 | Griffith | B01D 29/52 210/497.1 |
| 2,332,965 | A * | 10/1943 | Ducommun | B01D 29/114 210/696 |
| 2,354,150 | A * | 7/1944 | Skinner | B01D 29/70 210/330 |
| 2,439,463 | A * | 4/1948 | Gebauer | B01D 35/18 210/402 |
| 2,485,547 | A * | 10/1949 | Blau | E04D 13/0409 210/354 |
| 2,672,983 | A * | 3/1954 | Blau | E04D 13/0409 210/354 |
| 2,807,368 | A * | 9/1957 | Blau | E04D 13/0409 52/12 |
| 3,341,020 | A * | 9/1967 | Sivadon | E04D 13/0409 52/12 |
| 3,616,914 | A * | 11/1971 | Reid | B01D 33/461 210/355 |
| 3,638,369 | A * | 2/1972 | Albrecht | E04D 13/08 52/16 |
| 3,959,140 | A * | 5/1976 | Legras | B01D 29/94 210/489 |
| 4,204,964 | A * | 5/1980 | Cailliot | B04B 3/08 210/373 |
| 4,241,547 | A * | 12/1980 | Bove' | E04D 13/076 52/16 |
| 4,602,460 | A * | 7/1986 | Langenbach | E04D 13/08 210/111 |
| 4,849,105 | A * | 7/1989 | Borchert | B01D 29/33 210/411 |
| 4,994,332 | A * | 2/1991 | Coin | H01M 8/0693 429/405 |
| 5,085,771 | A * | 2/1992 | Huang | B01D 29/52 210/512.3 |
| 5,271,571 | A * | 12/1993 | Maynard, Jr. | E03C 1/2665 241/74 |
| 5,851,087 | A * | 12/1998 | Berry, III | B01D 29/15 210/161 |
| 6,089,790 | A * | 7/2000 | Berry, III | E03B 3/04 138/41 |
| 6,386,752 | B1 * | 5/2002 | Hagino | B01D 21/26 210/260 |
| 7,351,269 | B2 * | 4/2008 | Yau | A47L 9/20 55/296 |
| 7,419,520 | B2 * | 9/2008 | Lee | A47L 9/20 15/352 |
| 7,501,058 | B1 * | 3/2009 | Lawrence, Sr. | B01D 33/073 210/232 |
| 7,568,640 | B2 * | 8/2009 | Rademacher | E04D 13/0765 241/282.2 |
| 7,718,055 | B2 * | 5/2010 | Lou | E04D 13/0409 52/302.1 |
| 7,883,038 | B2 * | 2/2011 | Migliaccio | E04D 13/0767 52/16 |
| 7,909,274 | B2 * | 3/2011 | Migliaccio | E04D 13/0645 52/16 |
| 9,101,859 | B2 * | 8/2015 | Jons | B04C 5/103 |
| 9,186,604 | B1 * | 11/2015 | Jons | B04C 5/04 |
| 9,327,219 | B2 * | 5/2016 | Brunswick | B01D 29/114 |
| 9,527,091 | B2 * | 12/2016 | Corcoran | B01D 29/6476 |
| 10,286,339 | B2 * | 5/2019 | Crandall | B01D 35/02 |
| 10,646,801 | B2 * | 5/2020 | Tameroglu | B01D 29/6415 |
| 10,744,510 | B1 * | 8/2020 | Plemmons | B02C 25/00 |
| 11,441,305 | B1 * | 9/2022 | Alhazza | E04D 13/0409 |
| 11,484,818 | B2 * | 11/2022 | De Los Reyes, III | B01D 29/114 |
| 11,920,350 | B2 * | 3/2024 | Iftissen | E04D 13/0409 |
| 12,006,795 | B2 * | 6/2024 | Maher | E21B 43/38 |
| 12,012,759 | B2 * | 6/2024 | Rasmussen | E04D 13/0409 |
| 12,018,489 | B2 * | 6/2024 | Majocka | E04D 13/0409 |
| 2008/0066391 | A1 * | 3/2008 | Rademacher | E04D 13/0765 52/12 |
| 2008/0245421 | A1 * | 10/2008 | Lou | E04D 13/0409 210/415 |
| 2010/0031583 | A1 * | 2/2010 | Chang | E04D 13/08 52/12 |
| 2014/0124432 | A1 * | 5/2014 | Yoon | B01D 29/114 210/355 |
| 2015/0083651 | A1 * | 3/2015 | Jons | B04C 5/22 210/196 |
| 2015/0165354 | A1 * | 6/2015 | Brunswick | B01D 29/15 210/415 |
| 2015/0343334 | A1 * | 12/2015 | Jons | B01D 29/33 210/195.1 |
| 2016/0263589 | A1 * | 9/2016 | Corcoran | B04C 5/04 |
| 2017/0136391 | A1 * | 5/2017 | Crandall | A46B 3/00 |
| 2021/0317666 | A1 * | 10/2021 | Majocka | E04D 13/0409 |
| 2021/0362078 | A1 * | 11/2021 | De Los Reyes, III | B01D 29/33 |
| 2022/0025653 | A1 * | 1/2022 | Huber | E04D 13/0409 |
| 2022/0120086 | A1 * | 4/2022 | Majocka | E04D 13/0409 |
| 2022/0145635 | A1 * | 5/2022 | Rasmussen | G08B 21/182 |
| 2022/0145728 | A1 * | 5/2022 | Maher | E21B 27/005 |
| 2022/0316214 | A1 * | 10/2022 | Williams | G01F 23/0007 |
| 2022/0339562 | A1 * | 10/2022 | Vestman | B01D 29/35 |

(56) References Cited

U.S. PATENT DOCUMENTS

| | | | |
|---|---|---|---|
| 2023/0272620 A1* | 8/2023 | Rasmussen | E04D 13/0409 |
| 2024/0058844 A1* | 2/2024 | Sturgill | B01D 41/04 |
| 2024/0309730 A1* | 9/2024 | Maher | E21B 27/005 |

FOREIGN PATENT DOCUMENTS

| | | | | | |
|---|---|---|---|---|---|
| CN | 213390457 U | * | 6/2021 | | |
| CN | 219471367 U | * | 8/2023 | | |
| DE | 202016006829 U1 | | 1/2017 | | |
| GB | 2399279 A | * | 9/2004 | | B08B 9/02 |
| JP | S6211929 A | | 1/1987 | | |
| JP | H10317609 A | | 12/1998 | | |
| JP | 2006225911 A | | 8/2006 | | |
| WO | WO-2024044130 A1 | * | 2/2024 | | A46B 13/02 |

\* cited by examiner

DEBRIS CLEARING SYSTEM AND METHOD

CROSS-REFERENCE TO RELATED APPLICATION

This application claims the benefit of priority to U.S. Provisional Patent Application Ser. No. 63/373,117 filed Aug. 22, 2022, the disclosure of which is incorporated by reference herein in its entirety.

TECHNICAL FIELD

The invention relates generally to a system and method for clearing debris from a drain strainer of a roof drain.

BACKGROUND

Commercial and residential buildings are often constructed with flat roofs that are covered with a water sealing/diversion system to handle/remove rainwater on the flat roofs. Water sealing/diversion systems come in many types, such as watertight membranes, gravel surface built-up roofs, SBS roof systems, and ballasted roof systems, for example. To remove rainwater from the flat roof, one or more drains may be placed in the water sealing/diversion system. As the rainwater collects, it may drain into the one or more of the drains. Each of the roof drains may include a drain strainer or screen to prevent leaves, dirt, and other unwanted debris from flowing into the drain, which may clog the drain pipe connected to the drain.

Over time, the drain strainer may get clogged from a buildup of moss, leaves, dirt, trash, and other debris. As the drain strainer gets progressively clogged, the flow of rainwater into the drain gets greatly restricted and the water may pool on the flat roof as a result. Ultimately, the drain strainer may get clogged completely causing up to several inches of water to accumulate on the flat roof. That accumulated water may then leak into the building through even a small failure in the drain or the water sealing/diversion system causing major damage inside the building.

The term "flat roof" is a misnomer as such flat roofs are not actually flat. Per most modern building codes, a newly constructed roof system typically requires a minimum slope of at least ¼" of drop over one horizontal foot. When the roof of an existing building is re-roofed, the slope may sometimes be as small as ⅛" of drop over one horizonal foot. It is rare for a building's roof to be left flat. The drains are typically located at the "bottom" of the sloped area so that the rainwater may drain to and into the drains.

The drain strainers are typically cleared manually by someone who periodically goes onto the roof and pulls and/or scraps away the buildup of moss, leaves, trash, and other debris from the drain strainers. This clearing process consumes the time and energy of one or more persons who could be handling other maintenance items on the building. The manual process also requires adhering to a regular clearing schedule.

What is need, therefore, is a system and method for overcoming the deficiencies of the manual clearing process.

SUMMARY OF THE INVENTION

According to a first aspect of the invention, a debris clearing system for clearing debris from an exterior surface of a drain strainer includes a base member having at least one attachment coupler configured to selectively removably attach the base member to the drain strainer. The system includes a support frame rotatably coupled to the base member and at least one arm assembly with a proximal end coupled to the support frame and a distal end. The system further includes a clearing member coupled to the distal end of the at least one arm assembly. The clearing member is configured to be positioned adjacent the exterior surface of the drain strainer when the base member is coupled to the drain strainer. The system also includes a drive unit operatively coupled to the support frame to selectively rotate the support frame and the at least one arm assembly relative to the base member. The clearing member is configured to clear debris from the exterior surface of the drain strainer when the drive unit is operated to rotate the support frame and the at least one arm assembly. The drive unit may be a motor.

In one embodiment, the clearing member may include a brush configured to clear debris from the exterior surface of the drain strainer. In that regard, a free end of the brush may have a profile that conforms to a profile of the exterior surface of the drain strainer.

In another embodiment, the system further includes a water diverting member coupled to the distal end of the at least one arm assembly. The water diverting member configured to divert water away from the drain strainer as the at least one arm assembly rotates about the drain strainer. In that regard, the water diverting member leads the clearing member as the at least one arm assembly rotates about the drain strainer.

In an embodiment, the support frame may include a ring gear engaging a drive gear rotatably coupled to the base member. The drive unit is coupled to the drive gear such that, when operative, the drive unit turns the drive gear which turns the ring gear and the support frame. The base member may further include first and second slave gears that engage the ring gear.

In an embodiment, the at least one arm assembly is pivotally coupled to the support frame. The at least one arm assembly may include a horizontal arm and a vertical arm joined by a coupling member. The coupling member may be configured to be moveable along the horizontal arm so that the vertical arm may be selectively positioned at varying radial positions from the support frame. The coupling member may be configured so that the vertical arm is selectively moveable vertically relative to the coupling member.

In an embodiment, the system may further include a top plate operatively coupled to the support frame and a shroud removably coupled to the top plate.

In an embodiment, the system may further include a moisture sensor operatively coupled to the drive unit. The drive unit may be configured to operate when the moisture sensor detects a predetermined amount of moisture.

In an embodiment the system may further include a flexible spacer affixed to a bottom surface of the base member. The flexible spacer may be configured to be interposed between the base member and the drain strainer when the base member is coupled to the drain strainer.

In an another embodiment, the system may further include a suspension frame operatively coupled to the debris clearing system and configured to suspend the debris clearing system above the drain strainer.

Another aspect of the invention includes a method of clearing a drain strainer coupled to a roof drain on a roof. The method includes providing a debris clearing system mounted to the drain strainer, where the debris clearing system includes at least one arm assembly, a clearing member coupled to a distal end of the least one arm assembly, where the clearing member positioned adjacent an exterior surface of the drain strainer, and a drive unit operatively coupled to the at least one arm assembly. The method includes operating the drive unit so as to rotate the at least one arm assembly and the clearing member about the exterior surface of the drain strainer, and clearing debris from the exterior surface of the drain strainer as the clearing member moves adjacent to the exterior surface.

In one embodiment, the debris clearing system may further include a water diverting member coupled the distal end. The water diverting member is configured to divert water away from the drain strainer as the at least one arm assembly rotates about the drain strainer. The water diverting member leads the clearing member as the at least one arm assembly rotates about the drain strainer.

In one embodiment, the debris clearing system may further include a moisture sensor operatively coupled to the drive unit and the method further includes sensing moisture with the moisture sensor and operating the drive unit when the moisture sensor detects a predetermined amount of moisture.

In an embodiment, the method further includes stopping the drive unit after a predetermined amount of time.

In an embodiment, the step of operating the drive unit may be initiated after a predetermined amount of time of nonoperation.

In an embodiment, the drive unit rotates the at least one arm assembly one rotation in about 1 to 30 seconds.

BRIEF DESCRIPTION OF THE DRAWINGS

The accompanying drawings in Exhibit A attached hereto, which are incorporated in and constitute a part of this specification, illustrate one or more embodiments of the invention and, together with a general description of the invention given above, and the detailed description given below, serve to explain the invention.

DETAILED DESCRIPTION OF THE INVENTION

Figure 1:
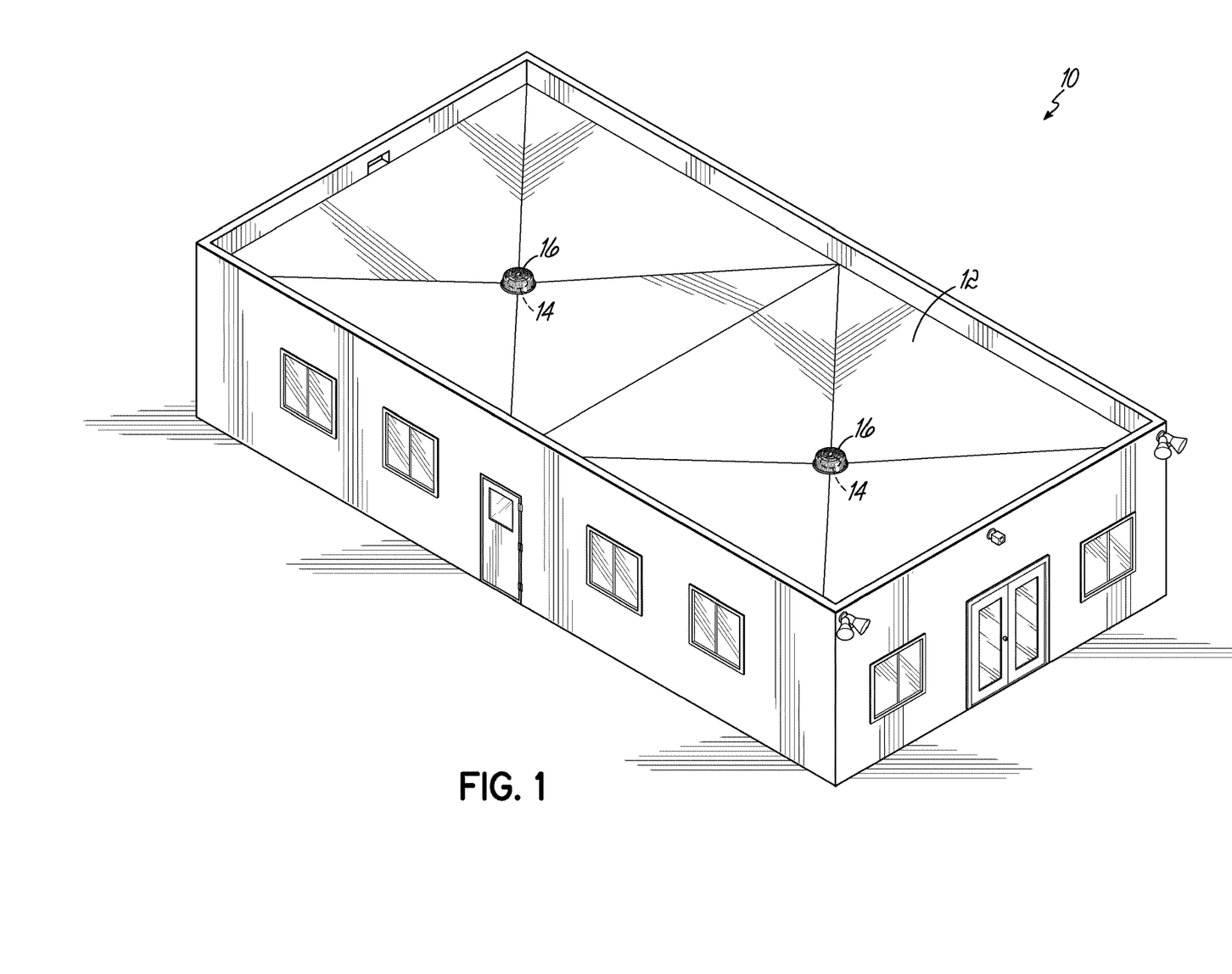
FIG. 1 is a perspective view of a building with flat roof and two drains covered by drain strainers.

FIG. 1 shows a building 10 with a flat roof 12 that is pitched slightly to funnel any rainwater to drains 14 positioned along a centerline of the flat roof 12. The drains 14 are connected to interior plumbing (not shown) which carries the collected water into storm drains/sewers, for example, which dispose of the rainwater from the flat roof 12. Because the flat roof 12 has only a very small amount of pitch, moss, leaves, trash, and other debris (collectively "debris") may accumulate on the flat roof 12. When rain falls, the water may carry that debris to the drains 14. To prevent that debris from going down into and clogging the drains 14, a drain strainer 16 may be coupled to the mouth of the drain 14. That drain strainer 16, however, may become clogged when enough debris accumulates around the drain strainer 16. A clogged drain strainer 16 may cause several inches of rainwater to accumulate on the flat roof 12 may then leak into the interior of the building 10.

Figure 2:
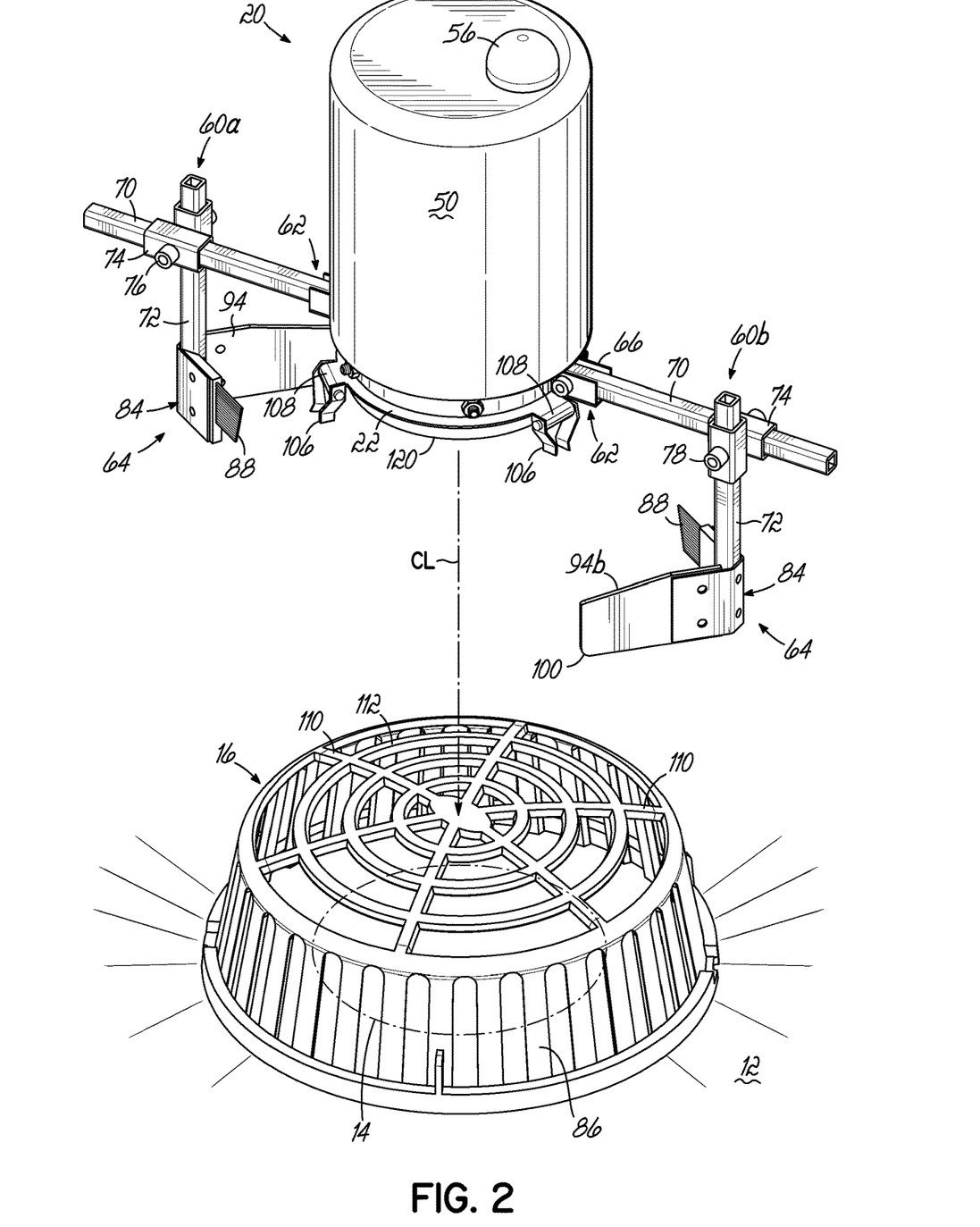
FIG. 2 is a perspective view of a debris clearing system according to an embodiment of the invention ready to be mounted to a drain strainer.
Figure 3:
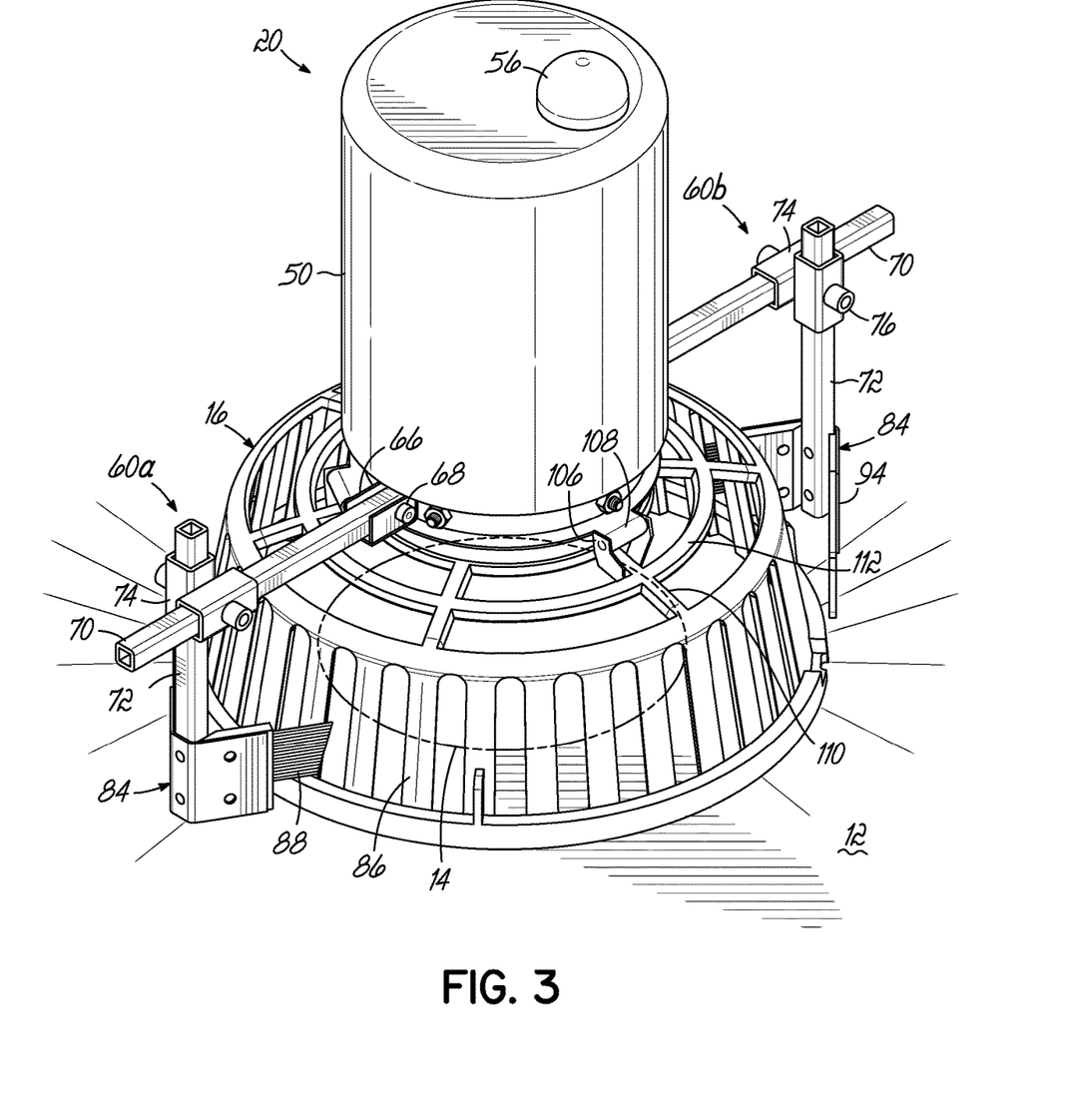
FIG. 3 is perspective view of the debris clearing system of FIG. 2 mounted to the drain strainer.

FIGS. 2 and 3 show a debris clearing system 20 ("system 20") according to an embodiment of the invention. The system 20 is configured so that the system 20 may be selectively removably attached to the drain strainer 16 with minimal effort or tools. In the embodiment illustrated in FIGS. 2 and 3, the system 20 essentially snaps onto the drain strainer 16. In FIG. 2, the system 20 is shown detached from the drain strainer 16, but is in position to be lowered down upon the drain strainer 16. In FIG. 3, the system 20 is detachably coupled to the drain strainer 16 and is in its operational configuration. The system 20 may be removed from the drain strainer 16 to be repaired or to be replaced by another system 20.

Figure 4:
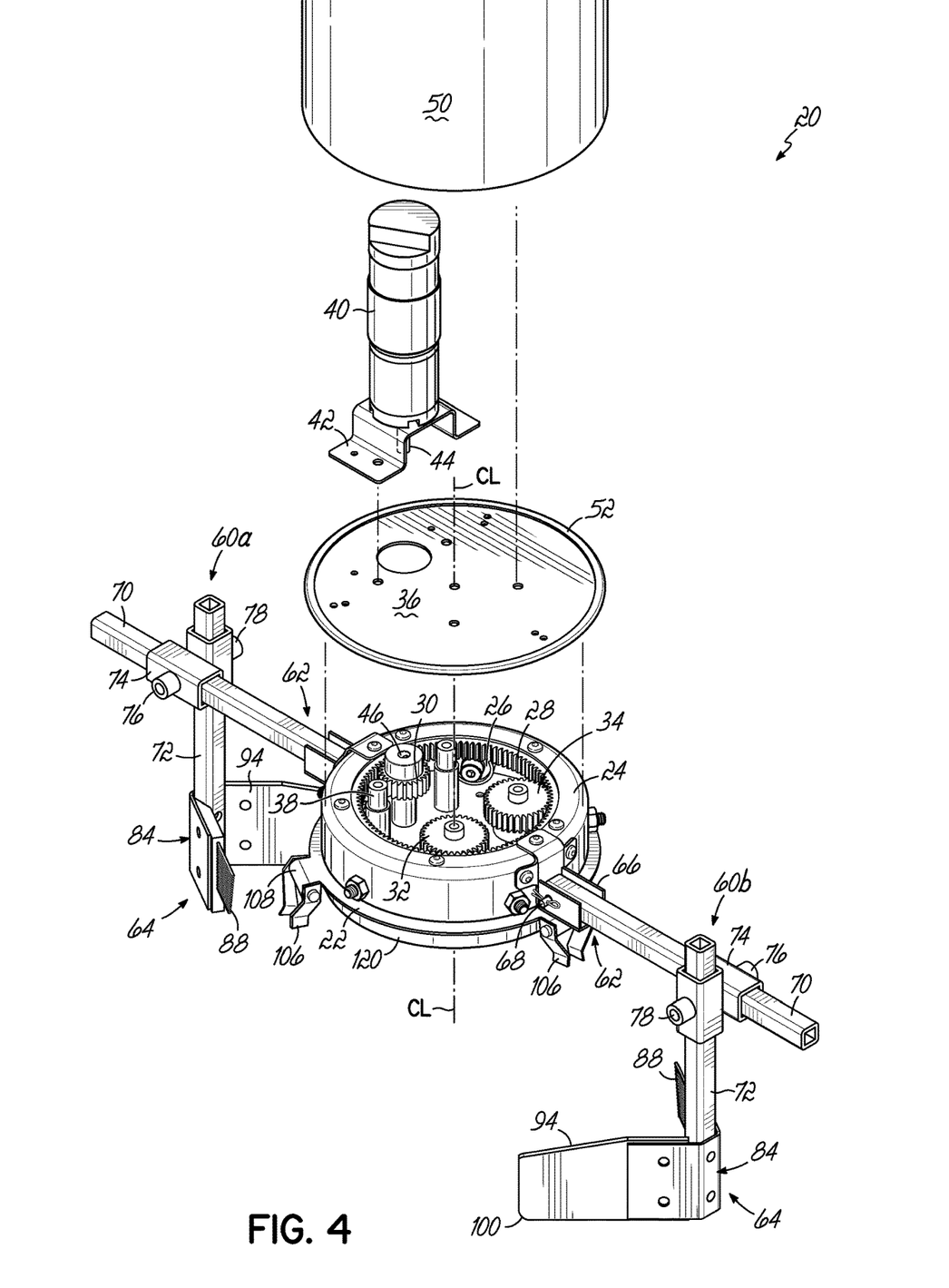
FIG. 4 is partially disassembled perspective view of the debris clearing system of FIG. 2.
Figure 5:
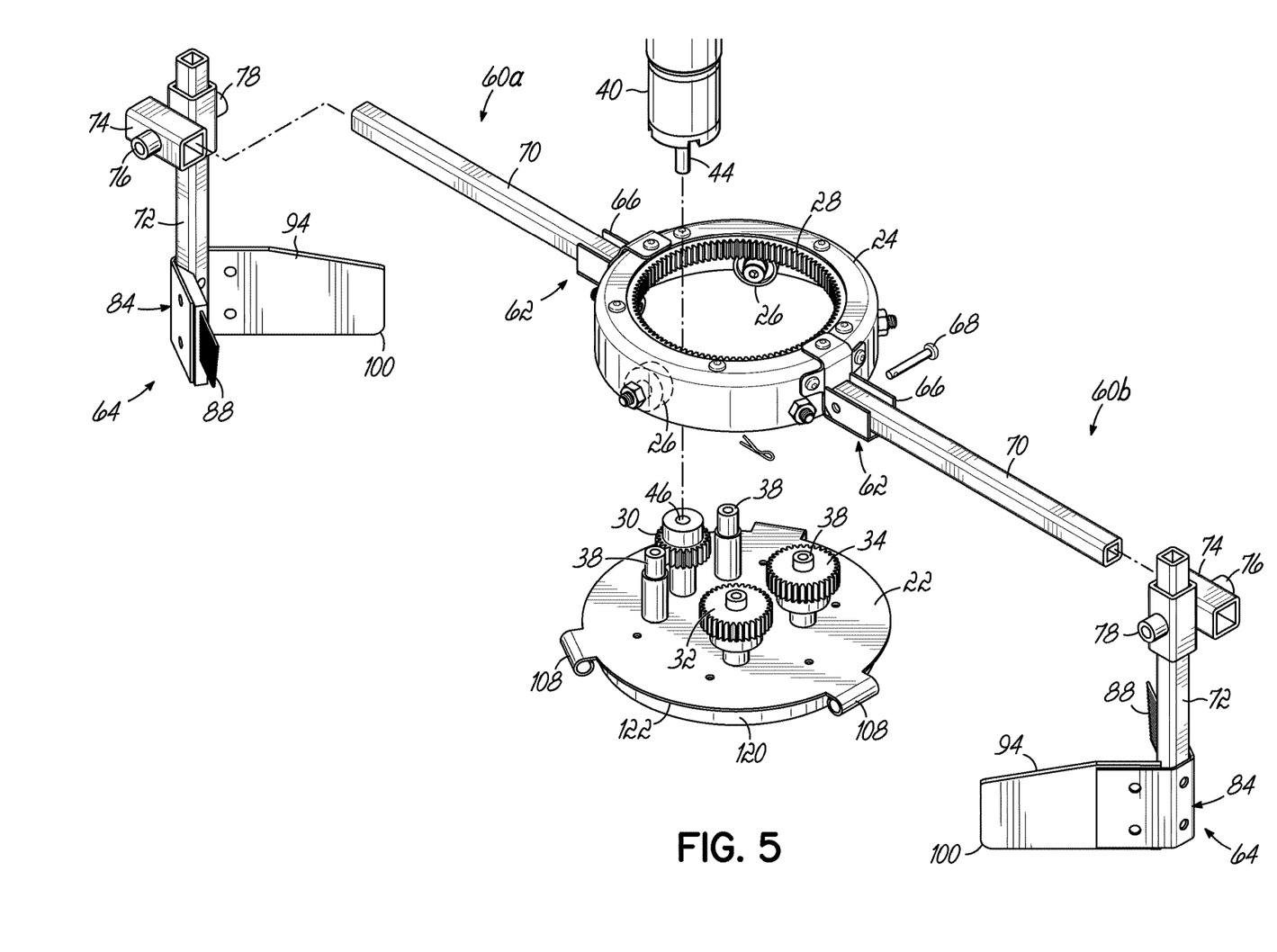
FIG. 5 is partially disassembled perspective view of the debris clearing system of FIG. 2.
Figures 6, 6A:
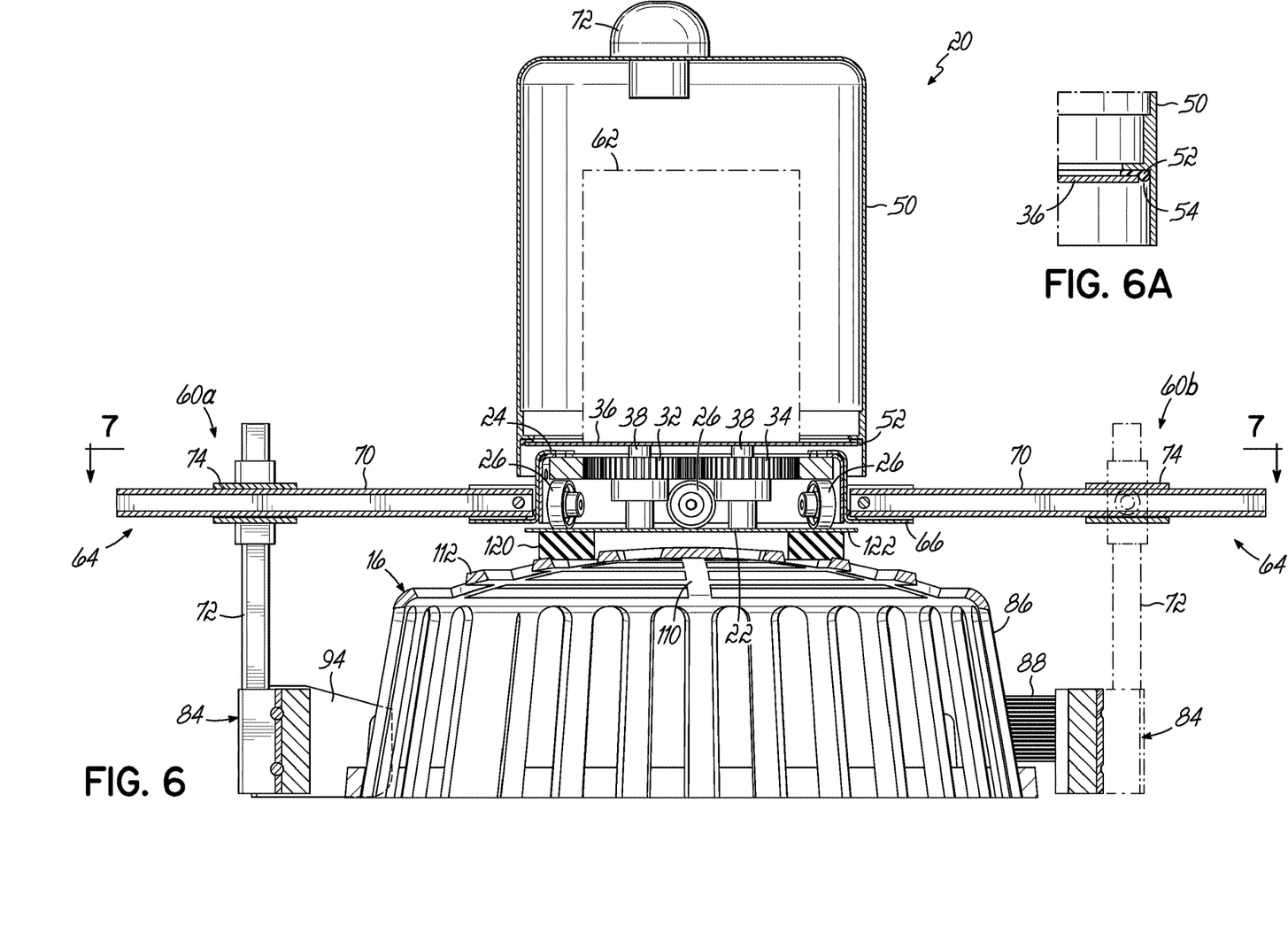
FIG. 6 is partial, cross-sectional view of the debris clearing system of FIG. 3.
FIG. 6A is detail view of a seal between a shroud and a top plate.
Figure 11:
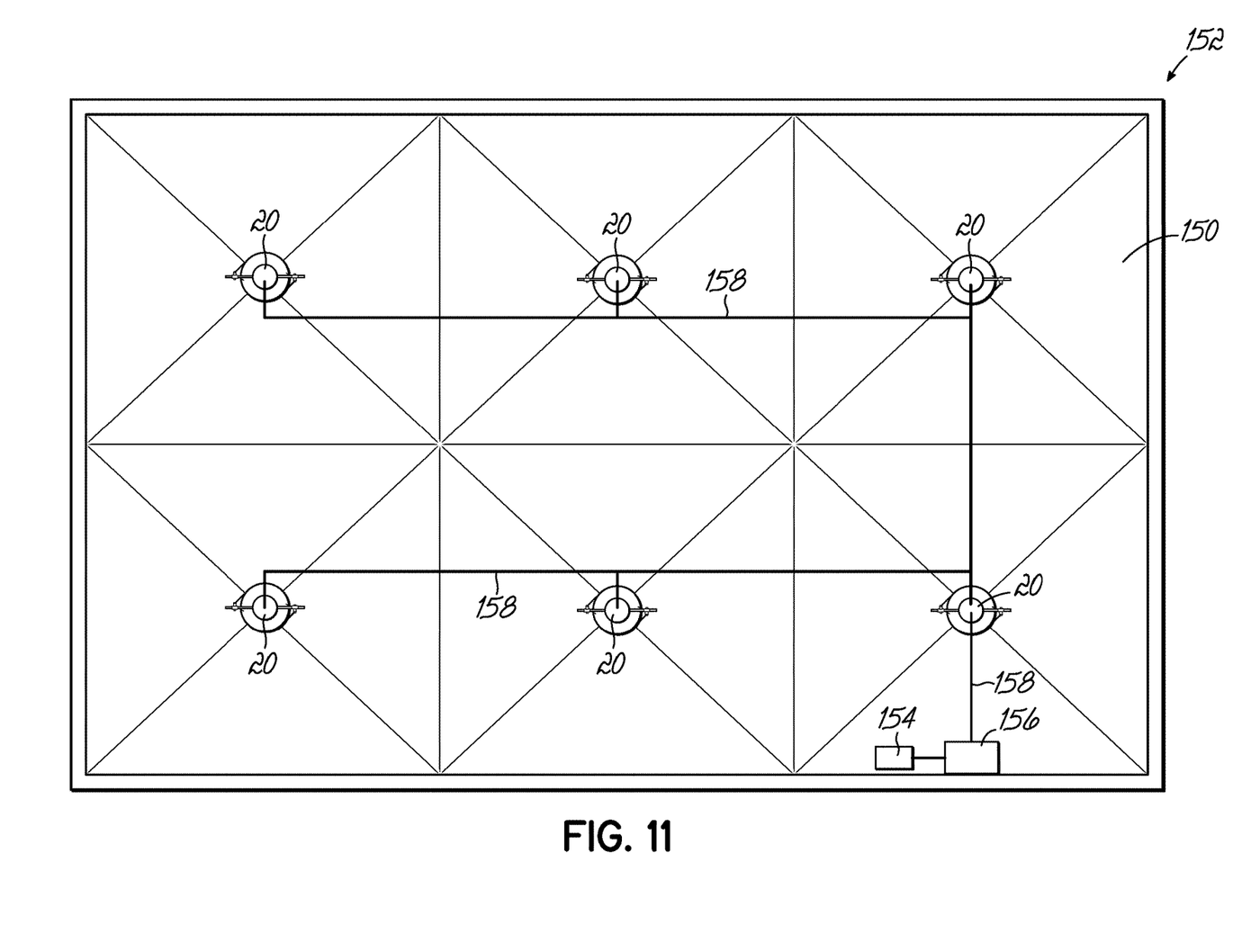
FIG. 11 is a schematic representation of a plurality of debris clearing system on a flat roof connected to a power supply.

With reference to FIGS. 4-6, the system 20 includes a base member 22 and a support frame 24 rotatably couple to the base member 22. The support frame 24 may include one or more rollers 26 to support the support frame 24 above the base member 22. The support frame 24 may also include a ring gear 28 configured to engage a drive gear 30 and first and second slave gears 32, 34, each of which are rotatably mounted to base member 22. The drive gear 30 and the first and second slave gears 32, 34 are positioned on the base member 22 so as that the ring gear 28 and the support frame 24 rotate about a central axis, CL. A top plate 36 is removably coupled to standoffs 38 and to the top of the first and second slave gears 32, 34. A drive unit 40, such as a motor, is coupled to the top plate 36 via a mounting bracket 42. A shaft 44, which extends from the drive unit (motor 40), is positioned in and secured to a center opening 46 of the drive gear 30 such that when the motor 40 operates to turn the shaft 44, the shaft 44 turns the drive gear 30, which turns the ring gear 28. In turn the ring gear 28 turns the support frame 24. In an embodiment, the motor 40 may be powered be a 12 DCV power supply (FIG. 11).

A shroud or cover 50 may be removably coupled to the top plate 36. The shroud 50 protects the motor 40 and the other internal components, such as the ring gear 28, the drive gear 30, and the first and second slave gears 32, 34, from rain, snow, hail, and other elements. The shroud 50 may include a sealing member 52 that rests upon the top plate 36 to seal a gap 54 (FIG. 6A) between the shroud 50 and the top plate 36. A moisture sensor 56 may be affixed to the top of the shroud 50 and be operatively coupled to the motor 40.

The motor 40 may be configured to operate when the moisture sensor 56 detects a predetermined amount of moisture. For example, the motor 40 may operate when the moisture sensor 56 detects at least one-quarter inch of rainfall.

Figure 8:
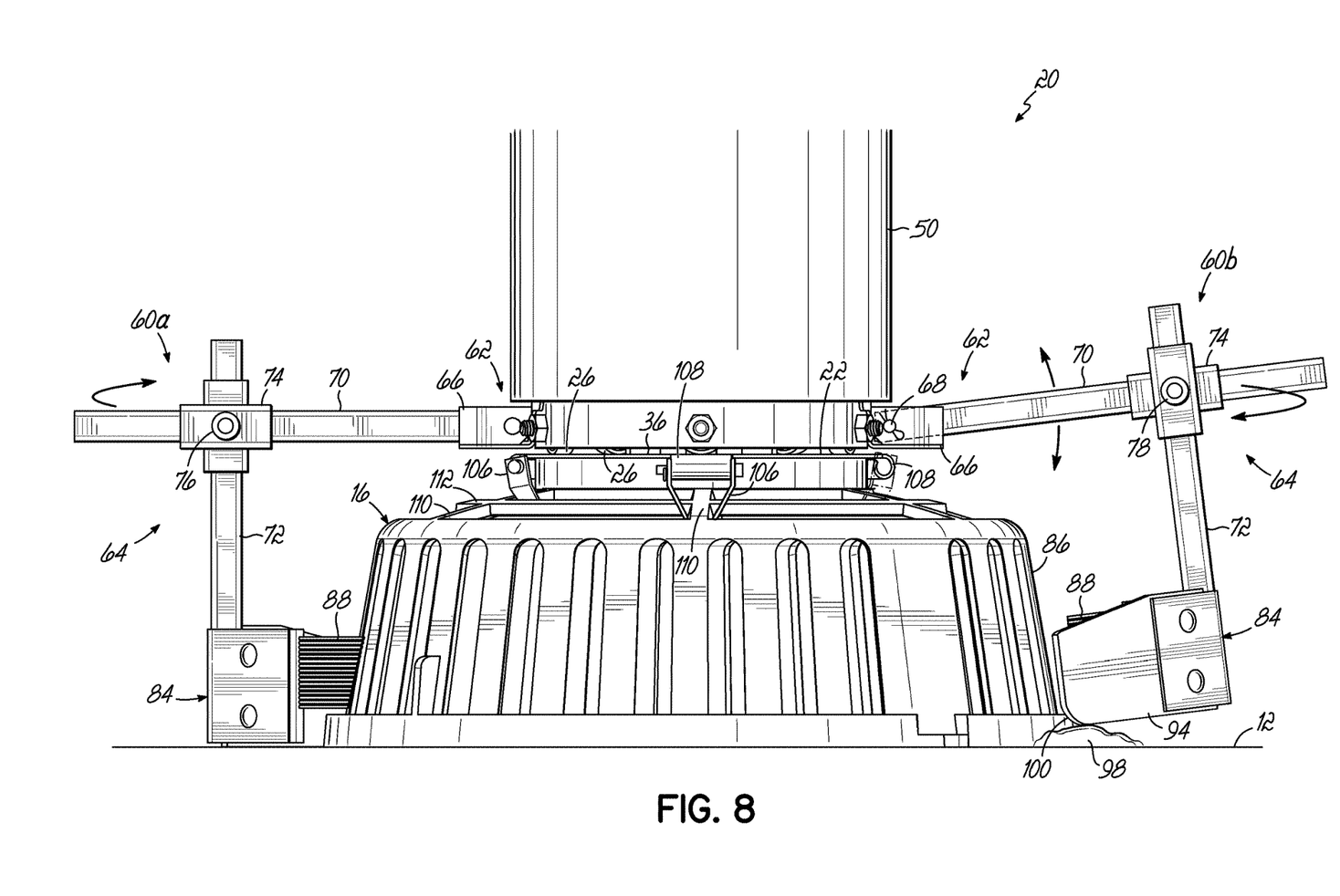
FIG. 8 is a partial elevational view of the debris clearing system of FIG. 3.

The system 20 includes at least one arm assembly. The system 20 in the figures has first and second arm assemblies 60a, 60b, which are essentially identical to one another. As such, only subcomponents of the first arm assembly 60a will be described and that description applies equally to the subcomponents of the second arm assembly 60b, which have the same corresponding reference numbers. The first arm assembly 60a includes a distal end 62 and a proximal end 64. The proximal end 64 is coupled to the support frame 24. In an embodiment, the proximal end 64 may be pivotably coupled to the support frame 24 via an attachment bracket 66 and a pin 68. The first arm assembly 60a may pivot about the pin 68 as illustrated in FIG. 8.

The first arm assembly 60a includes a horizontal arm 70 and a vertical arm 72 joined by a coupling member 74. The coupling member 74 is configured to move/slide along the horizontal arm 70 so that the vertical arm 72 may be selectively positioned at a desired radial position from the support frame 24. The coupling member 74 may include a fastener 76 that is configured to fix the vertical arm 72 in the desired radial position along the horizontal arm 70. The coupling member 74 is also configured so that the vertical arm 72 may be moved vertically, i.e., up or down, relative to the coupling member 74. The coupling member 74 may include a fastener 78 that is configured to fix the vertical arm 72 in a desired vertical position relative to the coupling member 74.

The adjustability of the horizontal and vertical arms 70, 72 permits the system 20 to accommodate drain strainers of various heights and diameters. See, e.g., FIGS. 6 and 10. For example, drain strainers may be 4 inches to 8 inches across the top and 12 inches to 14 inches across the bottom. The drain strainers may also vary in height from 4 inches to 10 inches depending on the manufacturer. Despite the wide range in the size of the drain strainers, the system 20 may be configured to work on any typical drain strainer regardless of its size. For example, the coupling member 74 may be moved radially outwardly along the horizontal arm 70 to accommodate drain strainers with wide diameters at their base. Similarly, the vertical arm 72 may be moved downwardly relative to the coupling member 74 to accommodate tall drain strainers.

The system 20 further includes a clearing member 84 coupled to the distal end 62 of the first arm assembly 60a. The clearing member 84 is configured to be positioned adjacent to an exterior surface 86 of the drain strainer 16 when the system 20 is coupled to the drain strainer 16 as illustrated in FIG. 2, for example. In an embodiment, the clearing member 84 may include a brush 88 configured to clear debris from the exterior surface 86 as the first arm assembly 60a rotates about the drain strainer 16. The brush 88 may be positioned close to, but not touching, the exterior surface 86 of the drain strainer 16. The end of the brush 88 may be positioned between 0.1 and 0.5 inches away from the exterior surface 86 of the drain strainer 16.

Figure 7:
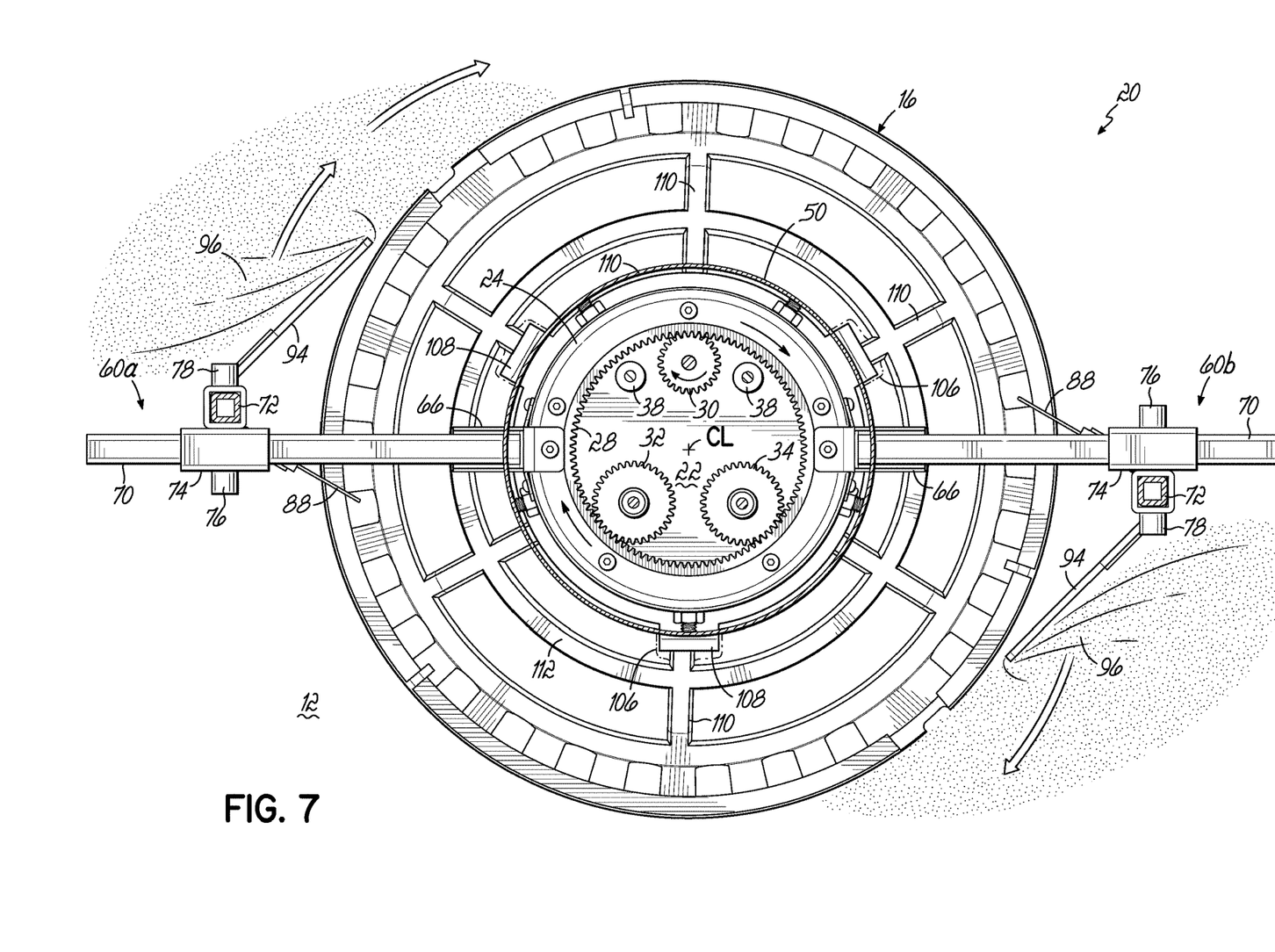
FIG. 7 is a partial cross-sectional view of the debris clearing system taken along line 7-7 in FIG. 6.

The system 20 may further include a water diverting member 94 coupled to the distal end 62 of the first arm assembly 60a. The water diverting member 94 is configured to divert water 96 away from the drain strainer 16 as the first arm assembly 60a rotates about the drain strainer 16 as schematically illustrated in FIG. 7. The water diverting member 94 leads (i.e., is in front of) the clearing member 84 as the first arm assembly 60a rotates about the drain strainer 16. Should the water diverting member 94 encounter debris 98 on the roof 12, the pivoting action of the first arm assembly 60a about pin 68 will permit the water diverting member 94 to ride over and move beyond the debris 98 as schematically illustrated in FIG. 8. When the water diverting member 94 moves beyond the debris 98, the weight of the first arm assembly 60a will return the first arm assembly 60a to its normal, unpivoted position. To assist with getting the water diverting member 94 over the debris 98, a leading edge segment 100b of the water diverting member 94 has a large radius to let the water diverting member 94 ride over the debris 98. In an embodiment, the motor 40 may include an emergency stop feature such that if any of the rotating structures, i.e., the support frame 24, the first and second arm assemblies 60a, 60b, the clearing members 84, or the water diverting members 94, encounters an obstruction such debris causing the motor 40 to bind excessively, the emergency stop feature will stop the operation of the motor 40. The obstruction and the emergency stop feature will have to be cleared before the motor 40 may operate again.

As noted above, the system 20 is configured so that the system 20 may be selectively removably attached to the drain strainer 16 with minimal effort or tools. To that end, one embodiment of the system 20 may include at least one attachment coupler 106 affixed to an attachment point 108 extending from the base member 22. The attachment coupler 106 is configured to clip onto either a radially-extending rail 110 or a circumferential rail 112 on the drain strainer 16. The attachment coupler 106 is also configured to allow the system 20 to be readily removed from the drain strainer 16 so the system 20 may be repaired or replaced by another system 20.

The system 20 may further include a flexible spacer 120 affixed to a bottom surface 122 of the base member 22. The flexible spacer 120 may construct of any suitable material such a rubber, foam, polymer, etc. The flexibility of the flexible spacer 120 allows the system 20 move slightly relative to the drain strainer 16 during operation of the system 20 such as when the water diverting member 94 or the brush 88 encounters debris. The flexibility of the flexible spacer 120 also accommodates for slight surface irregularities in the top of the drain strainer 16 where the system 20 mounts.

Figure 9A:
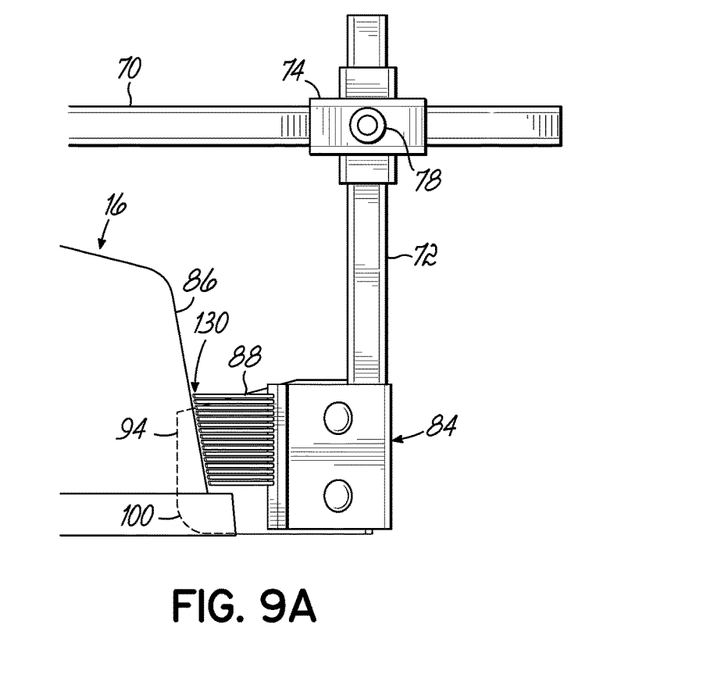
FIG. 9A is partial elevational view of a debris clearing system with a brush according to an embodiment conformed to the shape of a drain strainer.
Figure 9B:
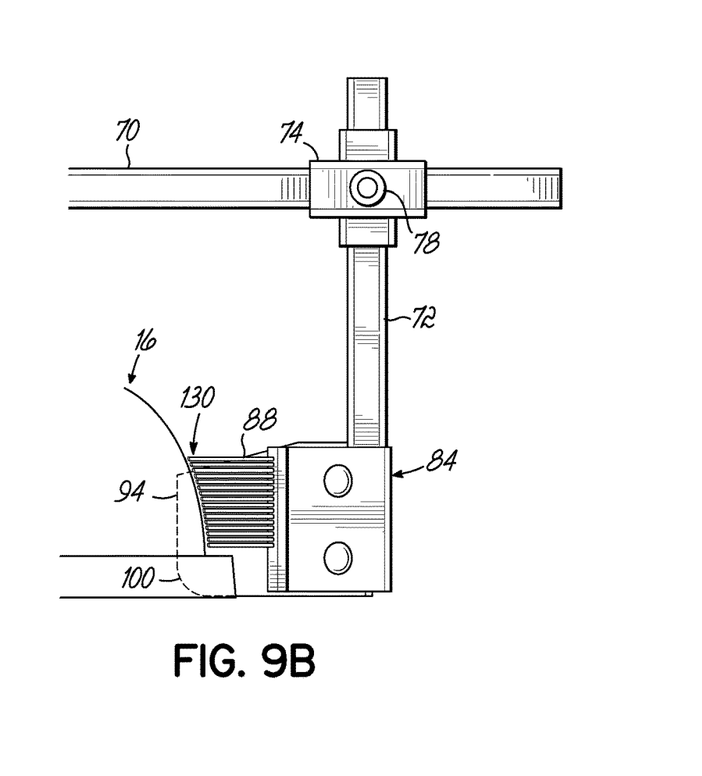
FIG. 9B is partial elevational view of a debris clearing system with a brush according to another embodiment conformed to the shape of a drain strainer.

Referring to FIGS. 9A and 9B, a free end 130 of the brush 88 may have a profile that conforms to the profile of the exterior surface 86 of the drain strainer 16. The conforming profile of the free end 130 permits the free end 130 to more effectively clear debris from the exterior surface 86 of the drain strainer 16 has it minimizes the gap between the free end 130 and the exterior surface 86. FIG. 9A illustrates a drain strain 16 with a primarily linear exterior surface 86 adjacent to the free end 130 of the brush 88. The free end 130 has a primarily linear profile that essentially matches/conforms to the linear profile of the exterior surface 86. FIG. 9B illustrates a drain strainer 16 with a curved exterior surface 86 adjacent to the free end 130 of the brush 88. The free end 130 has a curved profile that essentially matches/conforms to the curved profile of the exterior surface 86.

Figure 10:
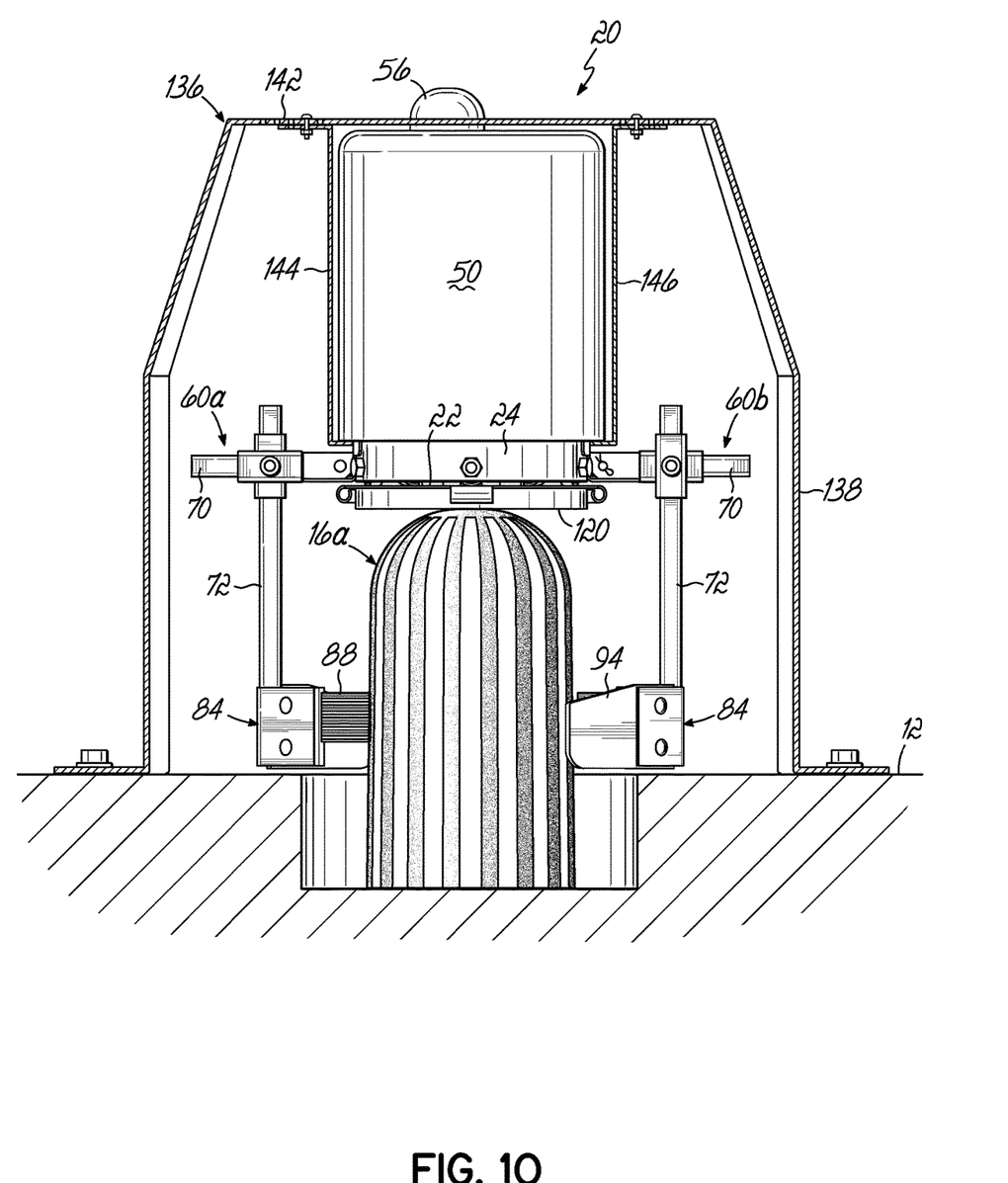
FIG. 10 is an elevational view of the debris clearing system adapted to clean a different drain strainer using a suspension frame according to an embodiment of the invention.

In some installations of the system 20, the top of the drain strainer may be shaped such that using the attachment couplers 106 are not suited to secure the system 20 to the drain strainer. For example, as illustrated in FIG. 10, a drain strainer 16a may be relatively narrow with a somewhat pointed top. As such, the attachment couplers 106 are unable to clip onto the drain strainer 16a. In such circumstances, a suspension frame 136 may be used to position the system 20 adjacent to the drain strainer 16*a*. In one embodiment, the suspension frame 136 maybe have support members 138, 140 coupled to a top plate 142. The suspension frame 136 may have capture members 144, 146 that extend from the top plate 142 and engage the system 20 below the shroud 50 to hold the system 20 in place above the drain strainer 16*a*. In an embodiment, the length of the capture members 144, 146 may be configured such that the flexible spacer 120 contacts the top of drain strainer 16 as illustrated in FIG. 10. In another embodiment, the length of the capture members 144, 146 may be configured such that the flexible spacer 120 (or if not present, the base member 22) does not contact the top of the drain strainer 16*a*. In other words, the system 20 would operate in a non-contact manner relative to the drain strainer 16*a*.

FIG. 11 schematically illustrates a plurality of systems 20 installed on a flat roof 150 of a building 152. The building 152 has an AC power source 154 providing 110 volts or 220 volts, for example, although other voltages may be available. The building 152 also includes a AC/DC transformer 156 the converts the AC voltage from the source 154 to DC voltage. The AC/DC transformer 156 is connected to at least one of the systems 20 via a low voltage line 158. In one embodiment, the low voltage line 158 connects the other systems 20 to the first system 20 receiving the low voltage line 158 from the AC/DC transformer 156. The plurality of systems 20 may be connected to the AC/DC transformer 156 in alternative ways as that illustrated in FIG. 11. The building 152 may further include at least one battery 160 (such as a deep-cycle battery) to power the plurality of systems 20 should the power go out and the AC power source 154 can no longer supply AC power to the AC/DC transformer 156. The battery 160 may be recharged once the AC power source 154 becomes operable again. Alternatively, a battery 162 may be included with the system 20 and placed under the shroud 50 as illustrated in FIG. 6.

The invention also contemplates a method of clearing debris from the exterior surface 86 of the drain strainer 16. The method includes mounting the debris clearing system 20 to the drain strainer 16, where the system 20 includes at least one arm assembly 60*a* and a clearing member 84 coupled to the distal end 62 of the at least one arm assembly 60*a*. The clearing member 84 is positioned adjacent the exterior surface 86 of the drain strainer 16. The system 20 also includes the motor 40 operatively coupled to the at least one arm assembly 60*a*. The method includes operating the motor so as to rotate the at least one arm assembly 60*a* and the clearing member 84 about the exterior surface 86 of the drain strainer 16. The method further includes clearing debris from the exterior surface 86 of the drain strainer 16 as the clearing member 84 moves adjacent to the exterior surface 86. In an embodiment of the method, the system 20 further includes the water diverting member 94 coupled to the distal end 62 of the at least one arm assembly 60*a*. The water diverting member 94 diverts water away from the drain strainer 16 as the least one arm assembly 60*a* rotates about the drain strainer 16.

The system 20 further includes the moisture sensor 56 operatively coupled to the motor 40 and the method further includes sensing moisture with the moisture sensor 56 and operating the motor 40 when the moisture sensor 56 detects a predetermined amount of moisture.

In an embodiment, the method further includes stopping the motor 40 after a predetermined amount of time. The predetermined amount of time may be between 30 seconds and 10 minutes, for example.

In an embodiment, the step of operating the motor 40 is initiated after a predetermined amount of time of nonoperation. The predetermined amount of time may be between 1 days and 14 days, for example. In an embodiment, the motor may rotate the at least one arm assembly 60*a*, 60*b* one rotation around the drain strainer 16 in about 1 to 30 seconds, more preferably about 5 to 20 seconds, and more preferably about 8 to 12 seconds.

When debris on the exterior surface 86 of the drain strainer 16 is dislodged by brushes 88, 88*b* and moved away by the flow created by the water diverting member 94, the debris may break down into smaller pieces. As the drain strainer 16 is cleared of debris, the accumulated water will begin to flow through the drain strainer 16 and into the drain 14. That flow of water brings those smaller pieces back to the drain strainer 16 and, if they are small enough, those smaller pieces may flow through the drain strainer 16, down the drain 14, and off the flat roof 12. Typically, the drain strainer 16 is configured so that anything that may fit between the slots in the drain strainer 16 will be able to flow down the drain 14.

While the invention has been illustrated by a description of various embodiments, and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

What is claimed is:

1. A method of clearing a drain strainer coupled to a roof drain on a roof, comprising:
   providing a debris clearing system mounted to the drain strainer, the debris clearing system including:
      at least one arm assembly;
      a clearing member coupled to a distal end of the least one arm assembly, the clearing member positioned adjacent an exterior surface of the drain strainer;
      a water diverting member coupled the distal end, the water diverting member being sized and shaped to divert water away from the drain strainer as the at least one arm assembly rotates about the drain strainer, wherein the water diverting member leads the clearing member as the at least one arm assembly rotates about the drain strainer; and
      a drive unit operatively coupled to the at least one arm assembly
   operating the drive unit so as to rotate the at least one arm assembly and the clearing member about the exterior surface of the drain strainer; and
   clearing debris from the exterior surface of the drain strainer as the clearing member moves adjacent to the exterior surface.

2. The method of claim 1, wherein the debris clearing system further includes a moisture sensor operatively coupled to the drive unit, the method further comprises:
   sensing moisture with the moisture sensor; and
   operating the drive unit when the moisture sensor detects a predetermined amount of moisture.

3. The method of claim 1, further comprising:
   stopping the drive unit after a predetermined amount of time.

4. The method of claim 1, wherein the step of operating the drive unit is initiated after a predetermined amount of time of nonoperation.

5. The method of claim 1, wherein the drive unit rotates the at least one arm assembly one rotation in about 1 to 30 seconds.

\* \* \* \* \*